United States Patent
Bass et al.

(10) Patent No.: US 6,932,948 B2
(45) Date of Patent: Aug. 23, 2005

(54) DEVICE AND PROCESS FOR PRODUCING A DEVICE FOR THE CATALYTIC GENERATION OF HYDROGEN FROM HYDROCARBONS

(75) Inventors: Joanna Bass, Lenningen (DE); Roland Cwik, Augsburg (DE); Tomas Stefanovski, Böblingen (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 704 days.

(21) Appl. No.: 09/877,262

(22) Filed: Jun. 11, 2001

(65) Prior Publication Data
US 2002/0021992 A1 Feb. 21, 2002

(30) Foreign Application Priority Data
Jun. 10, 2000 (DE) .......................................... 100 28 865

(51) Int. Cl.$^7$ ................................................. B01J 7/00
(52) U.S. Cl. ........................................ 422/196; 422/197
(58) Field of Search ................................ 422/196, 197; 48/61

(56) References Cited

U.S. PATENT DOCUMENTS

| | | | |
|---|---|---|---|
| 3,338,681 A | 8/1967 | Kordesch | ..................... 23/288 |
| 5,484,576 A | * 1/1996 | Langer et al. | ............... 422/211 |
| 5,674,301 A | 10/1997 | Sakai et al. | ..................... 48/61 |
| 6,517,805 B1 | * 2/2003 | Schuessler et al. | ...... 423/648.1 |

FOREIGN PATENT DOCUMENTS

| | | |
|---|---|---|
| DE | 33 02 384 | 1/1983 |
| DE | 197 43 673 | 10/1997 |
| EP | 0560157 | 9/1993 |
| EP | 0906890 | 4/1999 |
| EP | 0974392 | 1/2000 |
| EP | 1224967 | 7/2002 |
| JP | 10182102 | 7/1998 |
| WO | 01/19726 | 3/2001 |

* cited by examiner

Primary Examiner—Jonathan Johnson
(74) Attorney, Agent, or Firm—Crowell & Moring LLP

(57) ABSTRACT

A device for the catalytic generation of hydrogen from hydrocarbons includes a catalytic converter having feed and distribution channels for starting materials and discharge and collection manifolds for products. The feed and distribution channels and the discharge and collection manifolds are formed from a plurality of identically structured channels. Inlet channels for supplying and distributing starting materials and outlet channels for collecting and discharging products are defined by, in each case, inversely arranged closed and open channel ends. The inlet and outlet channels extend substantially across the entire catalytic converter and are provided in an alternately intermeshing arrangement.

9 Claims, 5 Drawing Sheets

DEVICE AND PROCESS FOR PRODUCING A DEVICE FOR THE CATALYTIC GENERATION OF HYDROGEN FROM HYDROCARBONS

BACKGROUND AND SUMMARY OF INVENTION

This application claims the priority of German patent document 100 28 865.0, filed Jun. 10, 2000, the disclosure of which is expressly incorporated by reference herein.

The present invention relates to a device and a process for producing a device for the catalytic generation of hydrogen from hydrocarbons, which comprises a catalytic converter. Feed and distribution channels for starting materials and discharge and collection manifolds for products are formed in the catalytic converter.

The storage of hydrogen, which is used, inter alia, as a fuel for fuel cells, is technically complex. Therefore, hydrogen is often stored in the chemically bound state, for example in the form of hydrocarbons or alcohols, and is reformed from these substances according to demand. To obtain hydrogen from hydrocarbons, a starting material mixture, which comprises hydrocarbon and water, is guided past a suitable catalytic converter with heat being supplied. If, by way of example, methanol is used as starting material, the starting materials are reacted at the catalytic converter in accordance with the following reaction equation: $CH_3OH + H_2O \rightarrow CO_2 + 3H_2$.

U.S. Pat. No. 5,674,301 has disclosed a device for reforming hydrogen which comprises a porous substrate. A catalyst for the catalytic reforming of hydrogen is incorporated in the pores of the porous substrate. A hydrogen-separating thin film is provided on inner surfaces of cylindrical passages which are formed in the porous substrate.

To generate the hydrogen, hydrocarbons and steam are fed to the substrate via an end face or a lateral face of the substrate, the cylindrical passages in the substrate being sealed so that the starting materials cannot enter them. The catalytic reforming of the hydrogen takes place at the catalyst material in the pores of the porous material. The product gas, which contains carbon dioxide and hydrogen, is distributed within the porous substrate and, on account of the hydrogen-separating thin film, only the hydrogen fraction can enter the cylindrical passages. The hydrogen is then discharged via the passages, which serve as outlet channels. Non-hydrogen fractions of starting gas and product gas are discharged from the substrate via a discharge line.

In another embodiment, the catalytic converter is formed outside the porous substrate in honeycomb form. The porous substrate with the cylindrical passages is arranged directly on the flow outlet side of the honeycomb catalytic converter, the substrate itself not containing any catalyst. The end face of the porous substrate is sealed with respect to the honeycomb catalytic converter, so that product gas emerging from the catalytic converter can only flow into the passages. On entering the porous substrate, the hydrogen is separated off by means of the hydrogen-separating thin film of the passages, the passages serving as outlet channels for the product gas of the catalytic converter.

In both embodiments, the cylindrical passages in the porous substrate only form outlet channels for the hydrogen which has been separated off or the hydrogen-containing product gas of the catalytic converter. A larger inlet area for the starting-material gas is provided by the honeycomb structure of the catalytic converter.

German laid-open specification DE 197 43 673 A1, has disclosed a device for the generation of hydrogen from hydrocarbons which is composed of catalytic-converter plates. The catalytic-converter plates are produced by compressing catalyst powder to form a shaped body. Channels for supplying, distributing, discharging and collecting the starting materials and products are provided in the shaped body.

Guide channels for supplying and discharging the starting materials and products extend perpendicular to the catalytic converter plate and are arranged congruently in the individual catalytic-converter plates. In an individual catalytic-converter plate, there are only distribution channels or collection manifolds which extend parallel to the surface extent of the catalytic-converter plate in question. The device is composed of catalytic-converter plates with distribution channels for the starting materials and catalytic-converter plates with collection manifolds for the products, with these plates stacked alternately on top of one another. The distribution channels and collection manifolds of the stacked catalytic-converter plates are oriented perpendicular to one another, so that the guide channels, distribution channels and collection manifolds form a mutually orthogonal system.

Catalytic-converter plates which allow the starting materials and products to be supplied, distributed, collected and discharged in each layer can be formed by pressing and sintering further catalyst material onto catalytic-converter plates which have already been sintered, as catalytic-converter plates with complex structures.

To achieve a high yield of reaction products, it is necessary, first, to ensure a sufficiently long residence time of the starting materials on the catalyst and, second, to ensure a high flow rate through the catalytic converter. In the cited prior art, for this purpose the honeycomb catalytic converter or the complex system of channels in the catalytic converter for guiding, distributing and collecting the starting materials or products are proposed. This makes the design of the device complicated and the individual components have a complex structure, resulting in a relatively high manufacturing outlay and cost.

By contrast, the present invention is based on the object of providing a device for the catalytic generation of hydrogen which is of uncomplicated design and comprises a small number of different components which are easily structured and produced, and also a simple production process.

This object is achieved by the device and production process according to the present invention. Accordingly, feed and distribution channels for starting materials and discharge and collection manifolds for products are formed from a plurality of identically structured channels. Inlet channels are provided for supplying and distributing starting materials and outlet channels are provided for collecting and discharging products. The function as an inlet channel or an outlet channel are determined by, in each case, inversely arranged closed channel ends and open channel ends. The inlet and outlet channels extend substantially over the entire catalytic converter and are provided in an alternately intermeshing arrangement.

The use of identical channel structures for supplying, distributing, collecting and discharging starting materials or products results in a repeating structure for all the channels, so that the design of the device or of components of the device is substantially homogenized. On account of this structure, in which inlet channels for supplying and distributing and outlet channels for distributing and discharging differ only by dint of inversely closed or open ends, it is possible to achieve a highly symmetrical structure of the device according to the present invention (i.e., a design which is simple to construct and produce). By incorporating the recurring structures, a design of this type can advantageously be achieved by a small number of different components which are arranged in multiple form against one another according to the design.

The intermeshing of inlet channels and outlet channels on the one hand provides a large inlet and outlet area on the catalytic converter for the starting materials or products, and on the other hand produces a uniform spatial distribution of starting materials and products throughout the sequence of the catalytic reaction, namely the supply of the starting materials, the conversion at the catalyst, and the discharge of the products. A high flow rate combined with a sufficient residence time is ensured by the large starting-material inlet areas, reaction areas, and product-outlet areas of the catalytic converter which are created in this way.

In an advantageous configuration of the present invention, the identically structured channels are designed in the form of straight channels. Straight channels are simple to produce using numerous production processes, such as drilling, milling, pressing, and are advantageous in terms of fluid dynamics.

In an advantageous configuration of the present invention, the identically structured channels are arranged parallel to one another. In this way, it is possible to achieve a particularly uniform and symmetrical arrangement.

In an advantageous refinement of the present invention, the identically structured channels are vertical channels. Accordingly, the inlet channels extend substantially in the direction of the force of gravity. In the case of liquid metering, for example via a spray nozzle, the inlet channels may advantageously be fed with starting materials from above. The result is good distribution of the starting materials over the catalytic-converter surface. During the starting phase, it is possible, for example, for liquid methanol to collect in the inlet channel of a platinum-containing catalytic converter and to react with air, thus heating the catalytic converter. Then, when the catalytic converter has been heated, the methanol which is metered in liquid form evaporates in the inlet channel, where it is uniformly distributed.

In a further advantageous configuration of the present invention, the inlet and outlet channels taper conically in cross section from the open end towards the closed end. As a result, a larger impingement area is created in the inlet channel and/or better distribution over the surface of the inlet channel is made possible for the starting materials, in particular in the case of metering by atomization of liquids.

In a preferred embodiment of the present invention, the device is substantially composed of catalytic-converter plates which are arranged against one another and have identical surface structures. The plurality of identically structured channels and the inversely arranged open channel ends and closed channel ends are formed as the surface structure of the catalytic-converter plate which is open on one side. The inlet and outlet channels are formed between the top side and underside of adjacent catalytic-converter plates as a result of the catalytic-converter plates being joined together. The device is advantageously constructed from identical components, namely the catalytic-converter plates, which are simple to produce and have a simple structure.

In an advantageous refinement of the present invention, the surface structure of the catalytic-converter plate is designed in such a way that the plurality of identically structured channels are arranged at regular intervals and have either an odd number of inlet channels to be formed or an odd number of outlet channels to be formed. In this way, it is possible to achieve an alternating arrangement of the inlet and outlet channels in the direction of joining of the catalytic-converter plates as well, if, for example, every second catalytic-converter plate is rotated through 180° about the vertical axis of the catalytic-converter plate in the device according to the present invention. Consequently, there is no need for two types of catalytic-converter plates with an offset arrangement of inlet and outlet channels.

In a preferred embodiment of the present invention, the device comprises an upper plate and a lower plate with openings and a central section with channel sections which are open on both sides. The plurality of identically structured channels are formed by the channel sections and the open channel ends and closed channel ends are formed by the openings and closed surfaces in the upper plate and lower plate. The device according to the present invention is advantageously composed fundamentally of only three different units. The openings in the upper and lower plates may be produced by simple machining, such as drilling or stamping, or may be formed concurrently with the production, for example pressing, of the plates.

In a preferred embodiment of the present invention, the central section is composed of catalytic-converter plates with a surface structure which is arranged perpendicular to the upper plate and lower plate. The channel sections which are open on both sides are formed as surface structures of the catalytic-converter plates which are open on one side and by the catalytic-converter plates being joined together, between the upper side and underside of adjacent catalytic-converter plates. A configuration of this type allows the open channel sections to be produced by simple surface machining of the catalytic-converter plate, or alternatively they may be formed concurrently during production. The length of the channel sections which are open on both sides is predetermined by the height of the vertically arranged catalyst layers.

In a further preferred embodiment of the present invention, the central section is composed of catalytic-converter plates which are arranged parallel to the upper plate and the lower plate. The channel sections which are open on both sides being designed in the form of congruent passages in the catalytic-converter plates. In this case, it is advantageous for all three units, namely the upper plate, lower plate and catalytic-converter plates to be produced using the same process, for example drilling or milling of openings or passages. This reduces the manufacturing outlay.

In a further preferred embodiment of the present invention, the device comprises an upper plate and a lower plate with openings, side walls, and tubes with an end which is closed on one side. The tubes are arranged at the openings in the upper plate and lower plate, the plurality of identically structured channels being formed by the tubes, and the open channel ends and closed channel ends being formed by the openings in the upper plate and lower plate. The ends of the tubes which are closed on one side, and the space which is encompassed by upper plate, lower plate, and side walls is filled with catalyst material. The device is substantially composed of a small number of different components, namely plates, tubes, and side walls, which moreover are of structurally simple design. In this case, the plates, side walls, and tubes do not have to consist of catalyst material, but rather may be produced from a very wide range of materials which are selected with a view to costs and manufacturing technology. In this way, it is possible to avoid difficulties such as those which arise with the machining of catalyst material or when joining catalyst material to other materials.

In a preferred refinement of the present invention, the openings in the plate are arranged in such a way that, when the plate rotates through defined angles in the plate plane, the openings of the plate which have not been rotated are not congruent with those of the plate which have been rotated, forming offset arrangements of openings. By a corresponding arrangement of the openings, which is not symmetrical with regard to certain rotation angles, it is possible to produce upper and lower plates with one type of plate with a single arrangement of the openings on the plate. During installation, the plates are arranged rotated with respect to one another, thus producing an offset arrangement of the openings in the upper and lower plates.

In the case of rectangular or square plates, the openings on the plate are arranged in such a way that the openings are offset with respect to one another at rotation angles of 180° and 90° or 180°. In the case of circular plates, the rotation angle is not determined by the external shape of the plate, but rather by a suitable arrangement of the openings.

It will be understood that the features referred to above and those which are yet to be explained below can be used not only in the combination specified in each case but also in other combinations or on their own without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
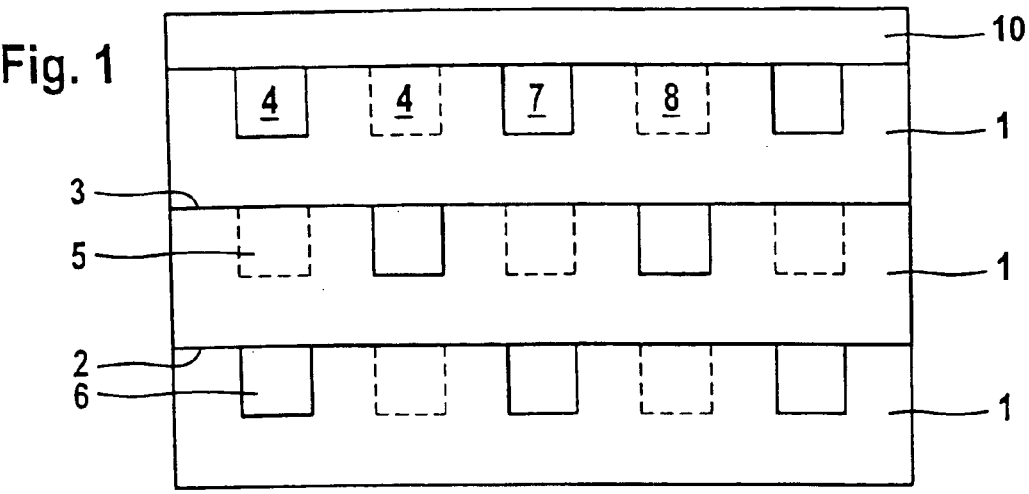
FIG. 1 shows a plan view of a first embodiment of the device according to the invention, which is composed of a plurality of catalytic-converter plates.

FIG. 1 shows a plan view of a first embodiment of the device according to the invention, which is constructed from a plurality of catalytic-converter plates 1, 10. The catalytic-converter plates 1, 10 are produced, for example, from catalyst powder, by pressing into a shaped body and subsequent sintering. To construct the device, identical catalytic-converter plates 1 with a surface structure 9 are joined together. A catalytic-converter plate 10 without a surface structure is provided to close off the final catalytic-converter plate 1. The catalytic-converter plates 1, 10 are preferably joined to one another by pressure sintering. When the catalytic-converter plates 1, 10 are joined together, vertical inlet and outlet channels 7, 8, which are oriented parallel to one another, are formed from the surface structure 9 between the top side 2 and underside 3 of adjacent catalytic-converter plates 1, 10.

Figure 2:
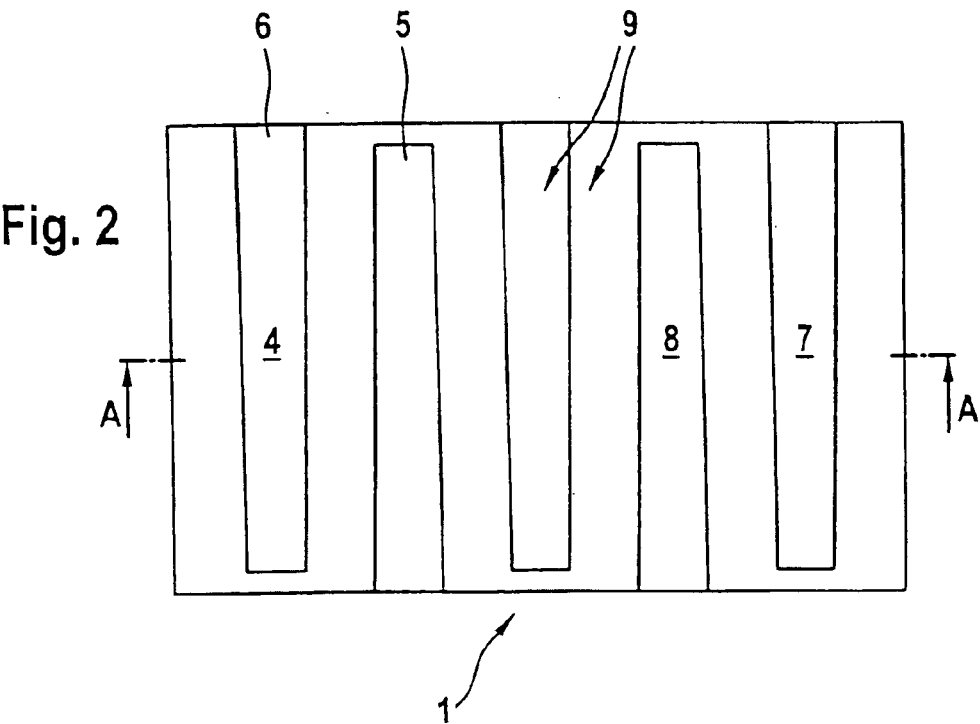
FIG. 2 shows a plan view of a catalytic-converter plate of the device shown in FIG. 1.
Figure 3:
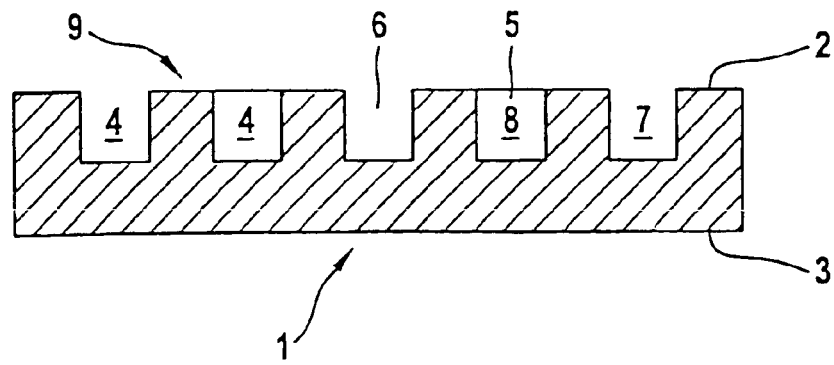
FIG. 3 shows a side view of a section through the catalytic-converter plate from FIG. 2 on line A—A.

FIG. 2 shows a plan view of a catalytic-converter plate 1 of the device shown in FIG. 1. The surface structure 9, which is formed on a top side 2 of the catalytic-converter plate 1, can be produced by means of machining or by pressing of the catalytic-converter plate 1. The surface structure 9 comprises a plurality of identically structured channels 4, which are arranged in intermeshing fashion and are distributed uniformly over the top side 2. To illustrate the surface structure 9 more clearly, FIG. 3 shows a section through the catalytic-converter plate 1 shown in FIG. 1, on line A—A, with identical reference numerals denoting identical elements.

The identically structured channels 4 have an open end 6 and a closed end 5. They are shaped conically, in such a manner that the cross section tapers from the open end towards the closed end. The channels 4 with channel ends which are open at the top and closed at the bottom form inlet channels 7. The channels 4 with channel ends which are open at the bottom and closed at the top form outlet channels 8. The inlet and outlet channels 7, 8 are arranged alternately in the longitudinal direction of the catalytic-converter plate 1. The number of inlet or outlet channels 7, 8 on a catalytic-converter plate 1 is preferably odd. As a result of every second catalytic-converter plate 1 being rotated through 180°, it is thus possible to achieve an alternating arrangement of the inlet and outlet channels 7, 8 along the direction in which the catalytic-converter plates 1 are joined together.

Figure 4:
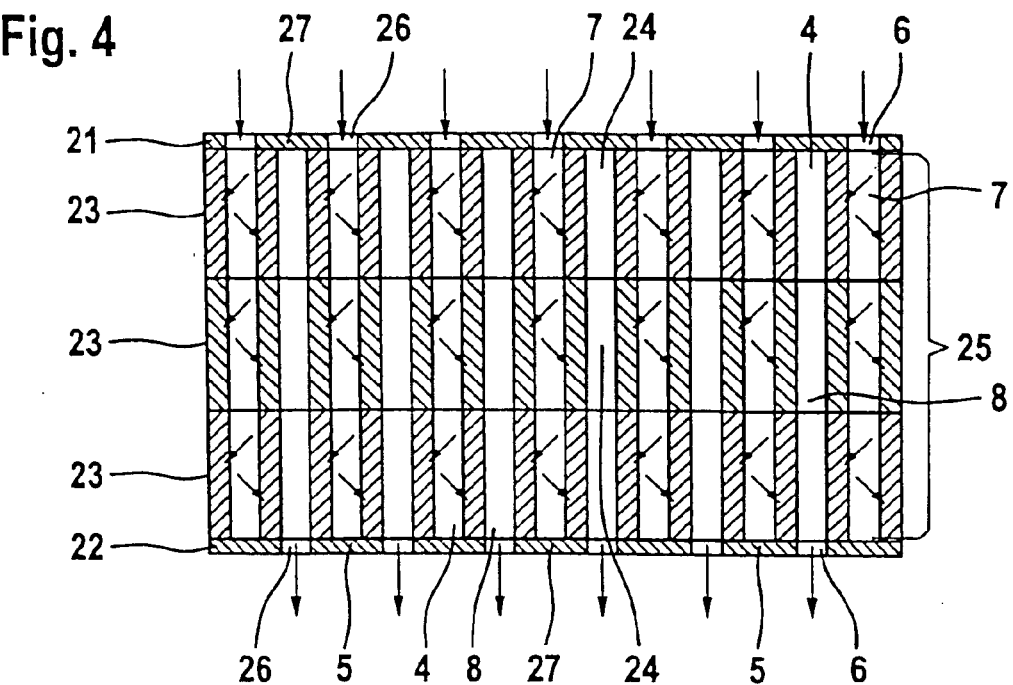
FIG. 4 shows a side view of a section through a second embodiment of the device according to the invention.

FIG. 4 shows a side view of a section through a second embodiment of the device according to the invention. The device is composed of an upper plate 21, a lower plate 22 and at least one middle plate 23, which may all be of different thicknesses. The middle plates 23 consist of catalyst material and are produced, for example, from pressed and sintered catalyst powder. The upper plate 21 and lower plate 22 are preferably also produced from catalyst material. The plates 21, 22, 23 can be joined by pressure sintering.

The middle plates 23 are oriented parallel to the upper and lower plates 21, 22. In the middle plates 23, there are vertical passages 24, which are distributed uniformly over the volume of the plate 23. The passages 24 of a plurality of middle plates 23 arranged above one another are congruent with one another and form channel sections 25 which are open on both sides.

In an embodiment which is not illustrated, the channel sections which are open on both sides are formed between the top side and the underside of vertically arranged plates with a suitable surface structure. For this purpose, straight and parallel recesses are provided on the top side of the plate, extending over the entire width of the plate.

In the upper plate 21 and the lower plate 22 there are openings 26 which are not congruent with respect to one another. These may be produced by drilling, stamping or directly during the pressing of the plates. The openings 26 or corresponding closed surfaces 27 delimit the channel sections 25, which are open on both sides. The result is channels 4 with channel ends 6, 5 which are open on one side and closed on one side, that is to say inlet and outlet channels 7, 8. The arrangement of the openings 26 is selected in such a way that inlet and outlet channels 7, 8 alternate with one another (i.e., an inlet channel 7 is surrounded by a plurality of outlet channels 8 and vice versa).

The arrangement of the openings 26 may also be configured in such a way that the openings 26, when the plate is rotated in its plane, do not match one another congruently at least for a specific rotation angle. With the openings 26 arranged in this way, it is possible to use a single type of plate for the upper and lower plates 21, 22, with the function as an upper or lower plate 21, 22 being produced by the plates being installed in a suitably rotated position with respect to one another.

Figure 5:
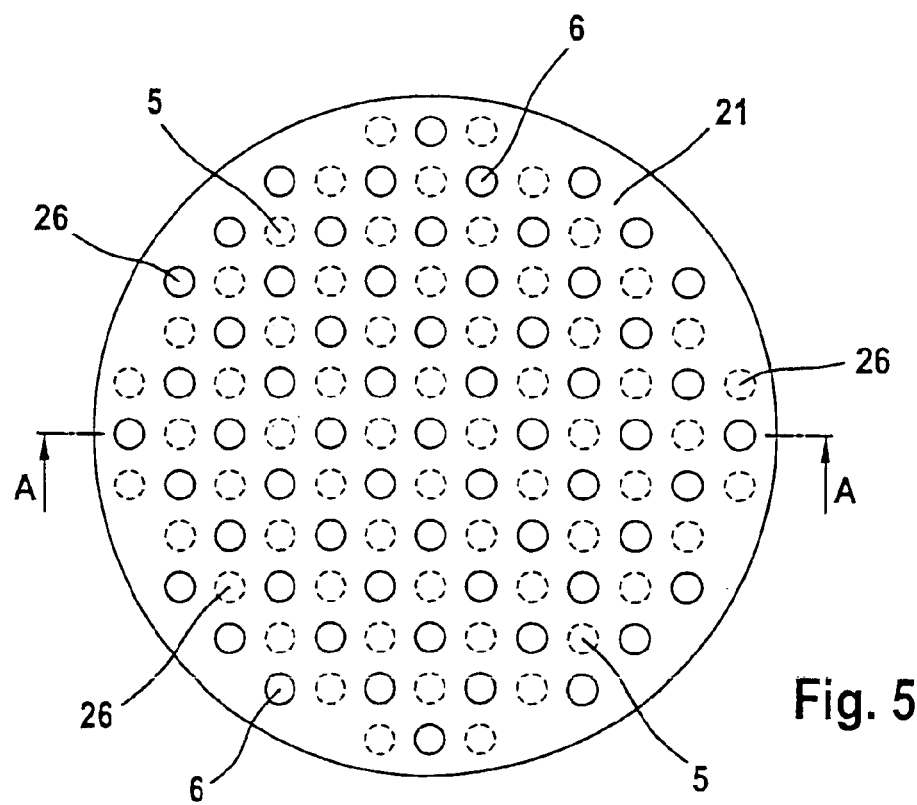
FIG. 5 shows a plan view of the second embodiment of the device according to the invention.

FIG. 5 shows a plan view of the second embodiment of the device according to the invention. The section through the device according to the invention which is shown in FIG. 4 is taken on line A—A in FIG. 5. The cross section through the device is in this case circular, but may also, as in the first embodiment, be polygonal. The openings 26 in the upper plate 21 and the open channel ends 6 of the inlet channels 7 are visible from above, whereas the openings 26 in the lower plate 22 and the open channel ends 6 of the outlet channels 8 are covered.

Figure 6:
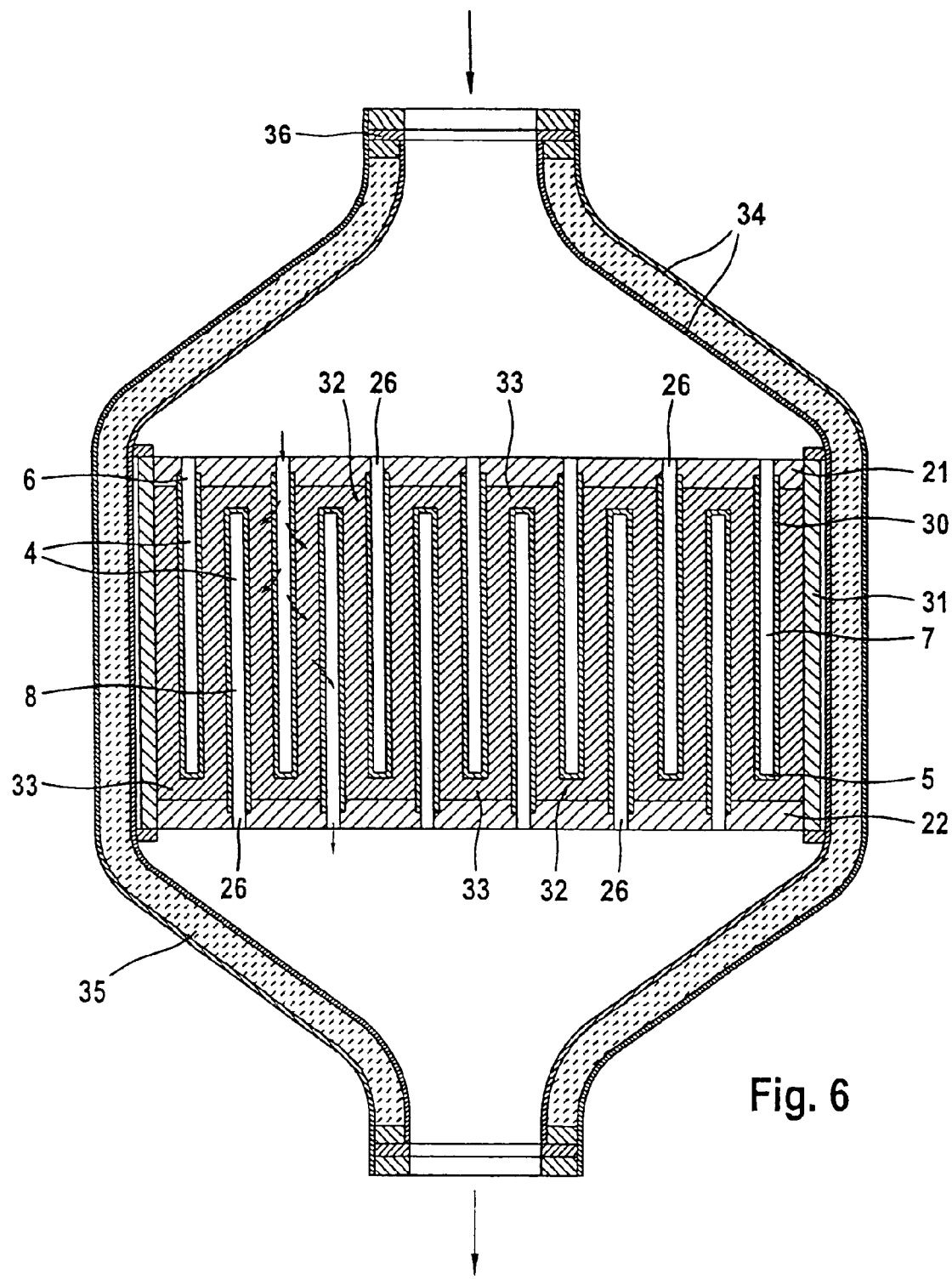
FIG. 6 shows a side view of a section through a third embodiment of the device according to the invention.

FIG. 6 shows a side view of a section through a third embodiment of the device according to the invention. The device comprises an upper plate 21 and a lower plate 22, side walls 31 and tubes 30. The upper plate 21 and the lower plate 22 are arranged spaced apart from one another on the side walls 31 and together encompass a space 32.

The tubes 30, which form the identically structured channels 4, are closed on one side. Openings 26 are formed in the upper and lower plates 21, 22. The tubes 30 are arranged in the interior of the space 32 and are attached to the plates 21, 22 in such a way that the openings 26 are flush with open ends 6 of the tubes 30. The internal space which remains is filled up with catalyst material 33, for example by introducing a catalyst powder. The plates 21, 22 and the tubes 30 consist of porous material; the pore size should be half as small as the grain size of the catalyst material. The device according to the invention is secured in a double-walled housing 34. For thermal insulation, the space between the housing walls 34 is filled with an insulating material 35, for example granular expanded glass. Attachment means 36 are provided for connection at the upper and lower ends of the housing.

When the device according to the invention is operating, starting materials, for example methanol and water, are supplied from above, in a fine spray, via a nozzle (not shown). The result is a uniform distribution of the starting materials. The starting materials are fed to the pulverulent catalyst material or the catalyst which has been pressed into plate form via the inlet channels 7 and partially also via the upper plate 21. The reaction products, in particular hydrogen, are collected and discharged via the outlet channels 8. The flow of starting materials and products is indicated by arrows in FIGS. 4 and 6. The device according to the invention is also particularly suitable as a cold-start component, in which the start time is positively influenced by liquid metering, gravity and good flow properties. The embodiments of the device according to the invention can be used to construct a multistage reactor.

Figure 7:
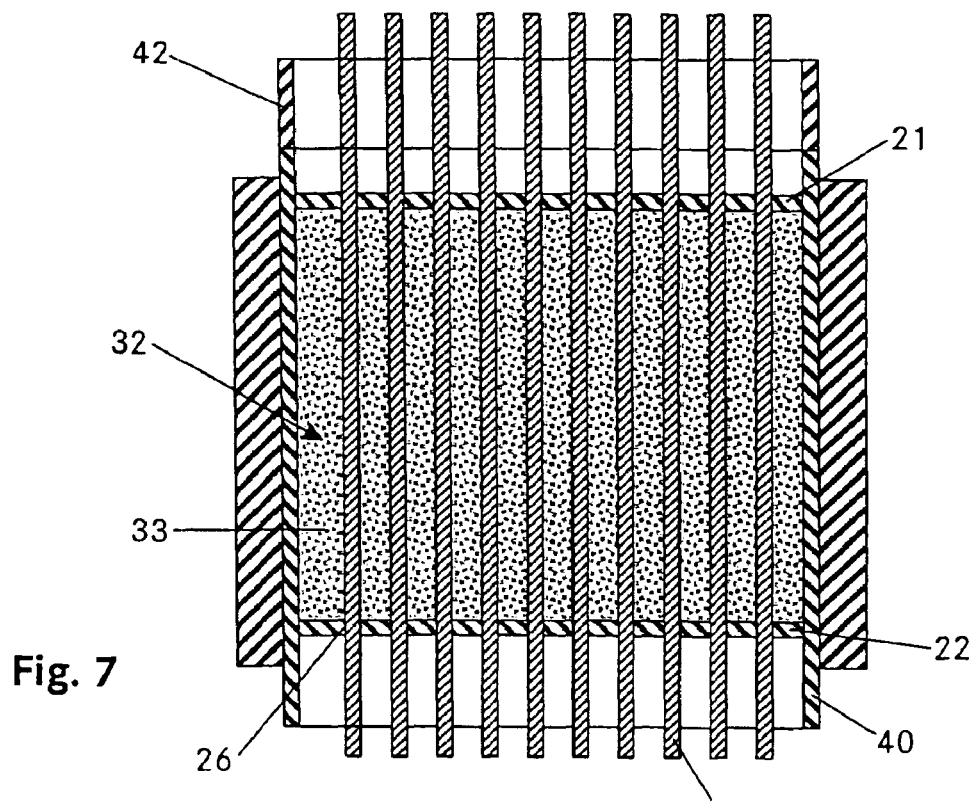
FIG. 7 shows a first embodiment of a device which can be used for the production of a device according to the invention, in section.
Figure 8:
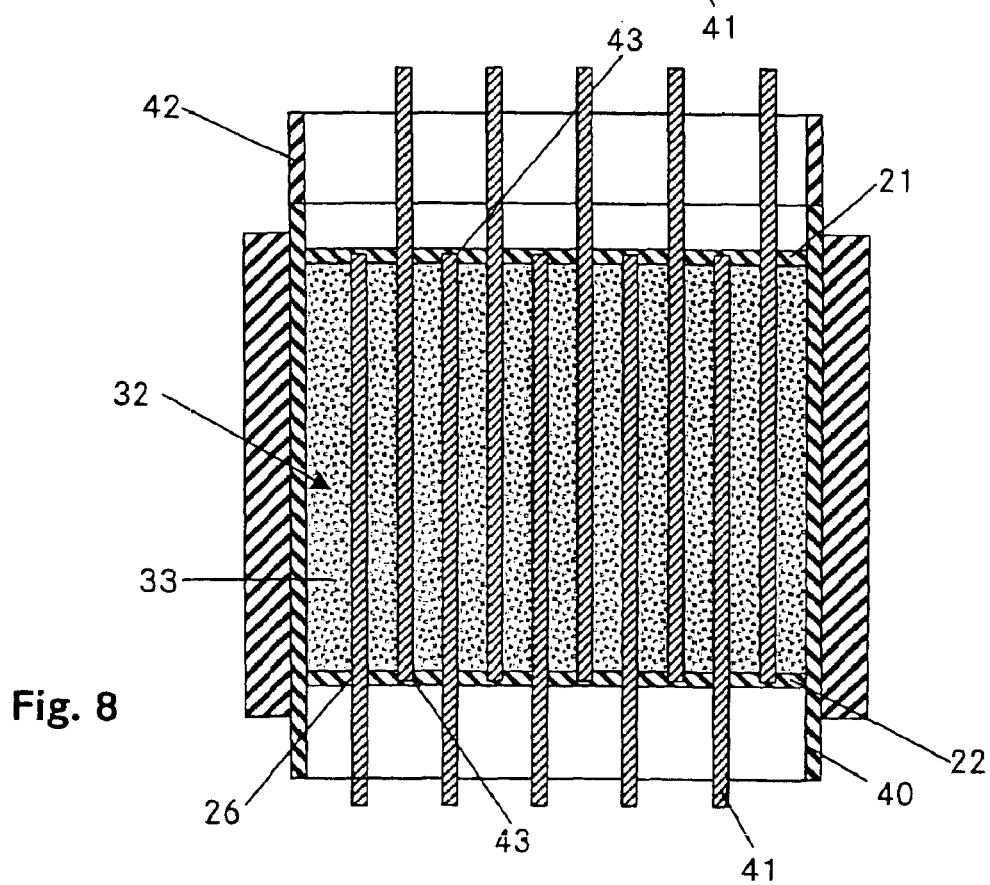
FIG. 8 shows a second embodiment of a device which can be used for the production of a device according to the invention, in section.
Figure 9:
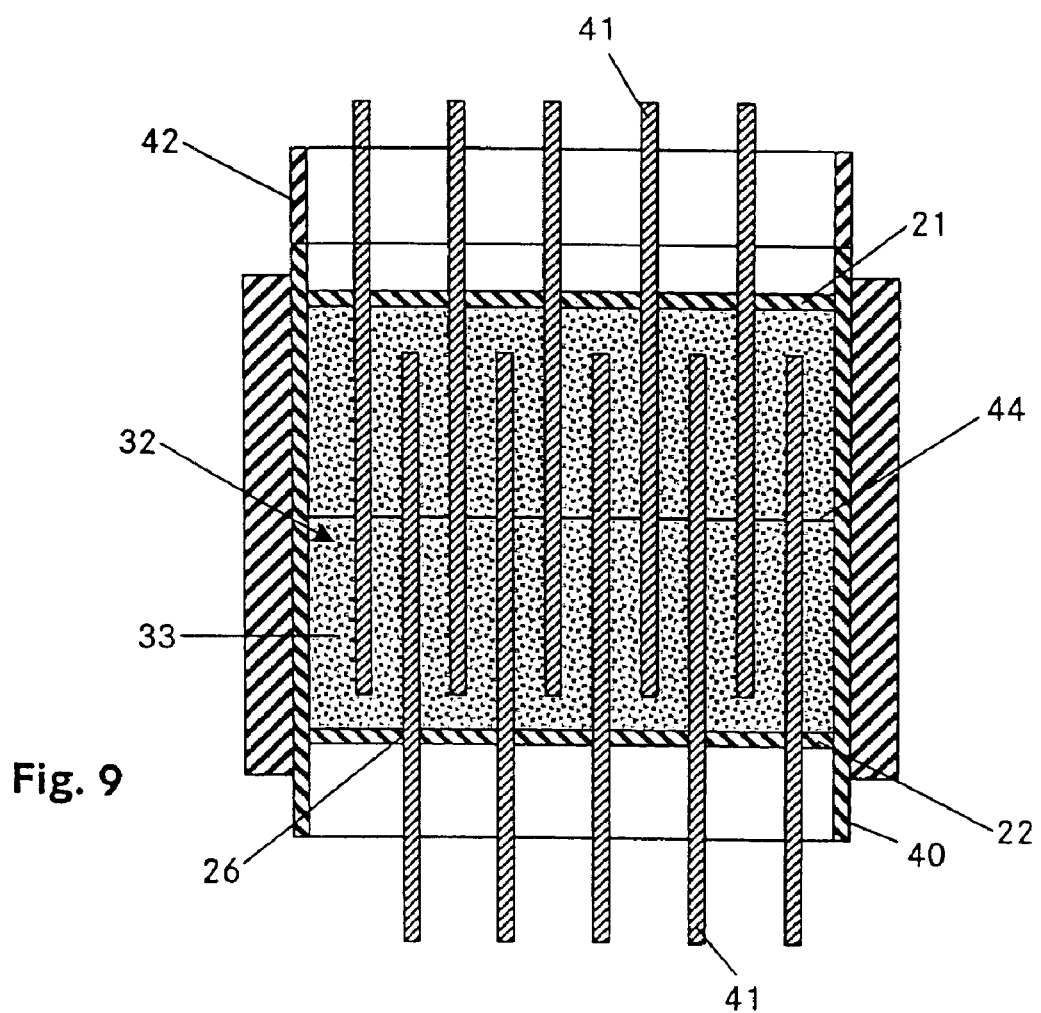
FIG. 9 shows a third embodiment of a device which can be used for the production of a device according to the invention, in section.

Suitable devices for producing a catalytic-converter body according to the invention are shown in FIGS. 7 to 9, identical parts once again being denoted by identical reference numerals. In a hollow body 40, an upper plate 21 and a lower plate 22 are arranged at a distance from one another in the axial direction, both plates 21, 22 having a plurality of openings 26. As an alternative to the hollow cylinder shape illustrated, the hollow body 40 may also have any other desired cross-sectional shapes, for example a square cross section. Accordingly, the plates 21, 22 would then be square in cross section rather than circular.

Shaped bodies 41, which extend beyond the space 32 in the axial direction, are fitted in a form-fitting manner into respectively corresponding openings 26 in the plates 21, 22. The space which remains between the two plates 21, 22 is filled with catalyst material 33. The catalyst material is then compressed. For this purpose, either one plate 21, 22 is fixedly connected to the hollow body 40 while a compressive force acts on the other plate, or both plates 21, 22 can move with respect to the hollow body 40, in which case a compressive force then acts on both plates 21, 22. The second case has the advantage that it is possible to achieve more uniform pre-compression across the entire space 32. During the pressing, the plates 21, 22 can move relative to the shaped bodies 41.

After the compression, the shaped bodies 41 are removed, so that in each case channels 4 are formed. Then, to form inlet or outlet channels 7, 8, it is still necessary to use suitable measures to close off in each case one channel end 5 in the region of the plates 21, 22. For this purpose, it is possible, for example, for each plate 21, 22 to be assigned a suitable diaphragm (not shown) which closes off in each case complementary openings 26 in the plates 21, 22.

The shaped bodies 41 used may, for example, be simple capillary tubes or round steel materials which are pulled out of the device in the axial direction after the compression has taken place. The external shape of these shaped bodies 41 in this case determines the shape of the channels 4. It is therefore possible, in addition to the circular shape, also to provide any other cross-sectional shapes for the shaped bodies 41, it merely being necessary to adapt the cross-sectional shape of the openings 26 to the cross-sectional shape of the shaped bodies 41. Furthermore, it is possible to use shaped bodies 41 of different cross-sectional shapes, for example with a different shape in the edge region from that in the central region. It is also possible for the cross-sectional shape of the shaped bodies 41 to change in the axial direction. It is merely necessary to ensure that the shaped bodies can be pulled through the openings 26 at least in one axial direction. As a further option, it is possible for the shaped bodies, in order to fix their position, to have a stop (not shown) which, for example during insertion, comes to bear against that side of one of the plates 21, 22 which is remote from the space 32.

Alternatively, the shaped bodies 41 may also consist of a material which is suitable for the shaped body 41 to be melted out after compression. For this purpose, the material of the shaped bodies 41 must have a melting point at which the catalyst material 33 remains undamaged. In this case, it is optionally also possible for a suitable diffusion layer to be applied to the outer surface of the shaped bodies 41, which diffusion layer remains on the inner surfaces of the channels 4 when the shaped bodies are melted out and, during subsequent operation of the device, determines the diffusion rate of the media from the channels 4 into the catalyst material 33. In this case, the layer thickness of the diffusion layer can advantageously be varied over the axial extent of the shaped bodies 41. The use of shaped bodies 41 which can be melted has the further advantage that the cross-sectional shapes of the shaped bodies 41 which are possible are less restricted, since the shaped bodies 41 do not have to be removed through the corresponding openings 26 after the compression has taken place. This means that the shaped bodies 41 may also have a cross-sectional shape which projects with respect to the shape of the openings 26. It is merely necessary to select the size of the openings 26 to be such that the material of the shaped bodies 41 can still be melted out sufficiently after the compression has taken place.

The plates 21, 22 themselves may likewise consist of catalyst material or of another material, for example steel. The compressive forces are preferably introduced on one or both sides using a suitable ram. The hollow body 40 may, for example, be used as a side wall 31 and thereby form a part of the device for the catalytic generation of hydrogen. Alternatively, however, the hollow body 40 may also form part of the production device, so that the catalyst body is removed from the hollow body 40 after the compression has taken place and is subsequently introduced into a suitable housing 34. If the hollow body 40 is used as a side wall 31, it will preferably have the minimum possible wall thickness, in order to reduce the weight of the finished device. In this case, a thick-walled mold 42 may be provided in order to absorb the compressive forces; this mold can be laid around the hollow body 40 during the compression and can subsequently be removed again. This mold 42 preferably comprises two parts which are screw-connected to one another.

To protect the channels 4 from damage, after the removal of the shaped bodies 41, they may additionally be fitted with a porous body, for example a capillary tube made from aluminium oxide ($Al_2O_3$). Furthermore, for the purpose of introduction of the catalyst material 33, it is possible for a ring 42 to adjoin the hollow body 40.

With this process, it is possible to produce a device for the generation of hydrogen with a high catalyst content based on the total mass of the device, with a reduced overall volume and a reduced overall mass. Moreover, production is simplified, since the number of individual parts required is relatively small and since only a few process steps are required.

In the embodiment shown in FIG. 8, unlike that shown in FIG. 7, identical openings 26 are not provided in the plates 21, 22. Rather, recesses 43, which are formed on those surfaces of the plates 21, 22 which face the space 32, are provided in both plates 21, 22, alternately next to openings 26. The openings 26 and recesses 43 on the two plates 21 and 22 are complementary with respect to one another. Consequently, the shaped bodies 41 are in each case only fitted in a form-fitting manner through one opening 26 in one of the plates 21, 22, while at the opposite plate 22, 21 they are simply fixed in a recess 43. Consequently, the recesses in each case simultaneously also form the closed end 5 of the associated channel 4. Subsequent sealing is therefore no longer required. Therefore, during the compression, each shaped body 41 remains fixed to one of the plates 21, 22, while moving relative to the other plate 22, 21. In this case, it is once again possible for one or both plates 21, 22 to be moveable and therefore for the compressive force to be introduced on one side or on both sides. In principle, it is also possible to combine the two processes, in which case some of the shaped bodies 41 are fixed on one side in associated recesses 43, while other shaped bodies 41 are fitted into openings 26 on both sides.

In a third embodiment, which is shown in FIG. 9, the shaped bodies 41 each extend only over a large part of the space 32 in the axial direction. For this purpose, they are fitted through openings 26 in one of the two plates 21, 22 but do not extend all the way to the opposite plate 22, 21. Rather, the shaped bodies 41 are additionally simply fixed in position by a suitable measure within the space 32, for example with the aid of a wire mesh 44 or the like which is arranged substantially centrally between the two plates 21, 22. This process has the advantage that, in each case, the closed end 5 of the channels 4 is formed directly by catalyst material, so that the plates 21, 22 are required only for production but not for operation of the device, and additional seals can be dispensed with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for catalytic generation of hydrogen from hydrocarbons, comprising:
   an upper plate having openings;
   a lower plate having openings; and
   a central section comprising feed and distribution inlet channels for supplying and distributing starting materials and outlet channels forming discharge and collection manifolds for products.
   wherein the inlet and outlet channels include a plurality of identically structured channels in the central section which are open on both sides;
   wherein open ends and closed ends of the inlet channels and the outlet channels are inversely arranged,
   wherein the open ends of the inlet channels and outlet channels are formed by the openings in the upper and lower plates, and
   wherein the closed ends of the inlet channels and outlet channels are formed by surfaces of the upper and lower plates.

2. A device according to claim 1, wherein the central section comprises a plurality of catalytic-converter plates arranged parallel to the upper plate and to the lower plate, wherein the feed and distribution channels and the discharge and collection manifolds are open on both sides and are configured in the form of congruent passages.

3. A device according to claim 1, wherein the channels are identically-structured straight channels.

4. A device according to claim 3, wherein the identically-structured channels are vertical channels.

5. A device for catalytic generation of hydrogen from hydrocarbons, comprising:
   an upper plate having openings;
   a lower plate having openings;
   side walls; and
   a central section comprising feed and distribution inlet channels for supplying and distributing starting materials and outlet channels forming discharge and collection manifolds for products,
   wherein the inlet channels and the outlet channels include tubes, each of said tubes having a closed end on one side,
   wherein the tubes are arranged at the openings in the upper plate and in the lower plate,
   wherein open ends of the inlet and outlet channels are formed by the openings in the upper plate and in the lower plate,
   wherein closed ends of the inlet and outlet channels are formed by the closed ends of the tubes, and wherein a space encompassed by the upper plate, the lower plate and the side walls is filled with catalyst material.

6. A device according to claim 5, wherein at least one of the upper plate, the lower plate, and the tubes comprise a porous material.

7. A device for catalytic generation of hydrogen from hydrocarbons, comprising:

a plurality of identical catalytic converter plates which are joined together, each of said identical catalytic converter plates having a first side on which a surface structure is formed and a second side without a surface structure, and a catalytic converter plate without a surface structure joined to the first side of an endmost plate of said identical catalytic converter plates, wherein the first side of each of said identical catalytic converter plates other than the endmost plate is joined to the second side of an adjacent one of said identical catalytic converter plates, wherein the surface structure comprises a plurality of channels distributed uniformly over the first side of each of the identical catalytic converter plates, wherein each of the channels has an open end and a close end, the open and closed ends arranged alternatingly in each identical catalytic converter plate so as to define alternating inlet and outlet channels, and wherein the inlet channels and the outlet channels of adjacent identical catalytic converter plates are parallel and alternate along a direction in which the identical catalytic converter plates are joined together.

8. A device according to claim 7, wherein the inlet channels and the outlet channels taper conically in cross section from the open ends towards the closed ends.

9. A device according to claim 7, wherein the channels are arranged at regular intervals and either an odd number of inlet channels or an odd number of outlet channels is provided.

* * * * *